March 7, 1944.   H. TRAUMÜLLER   2,343,593
HINGE
Filed Aug. 20, 1943
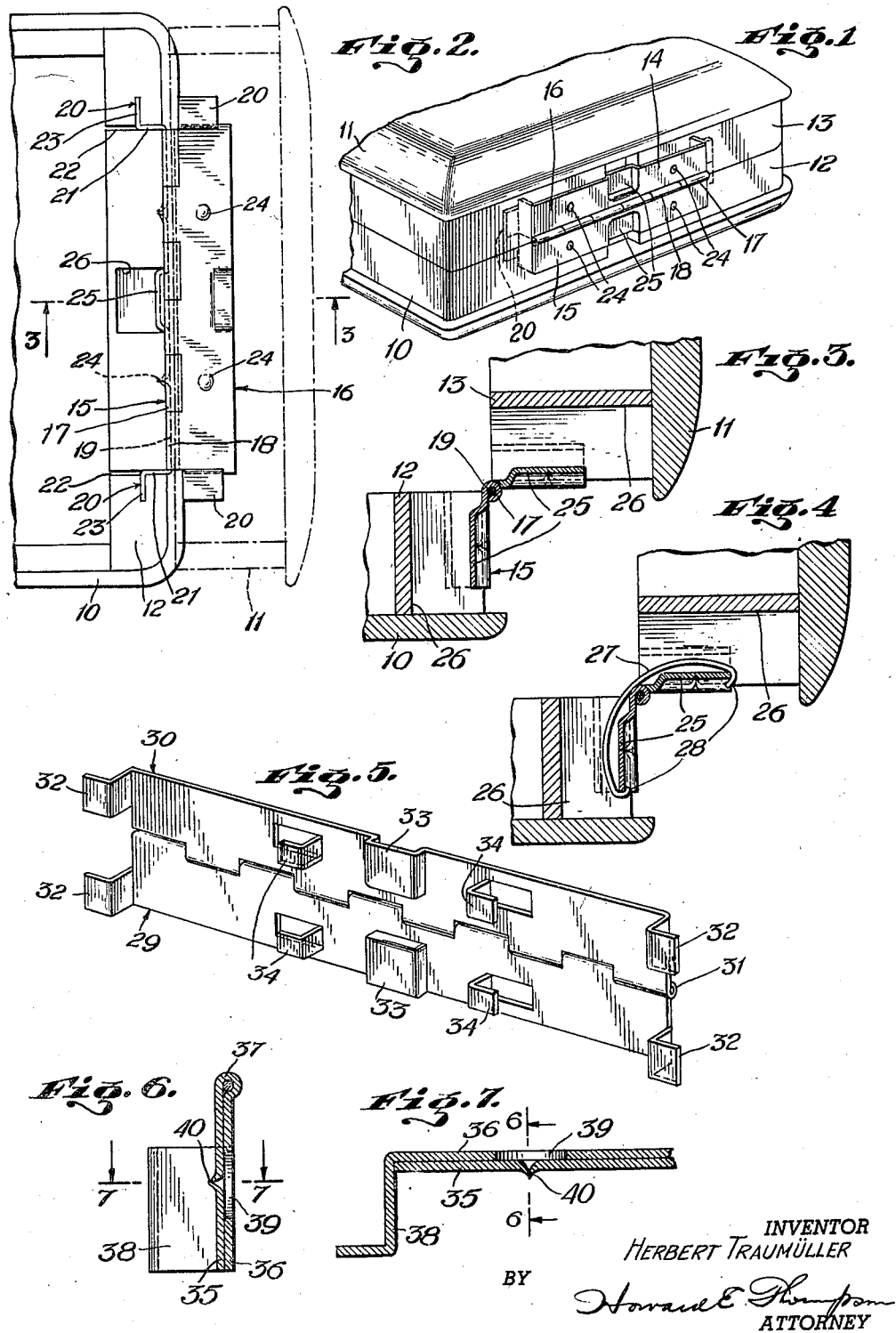
INVENTOR
HERBERT TRAUMÜLLER
BY
Howard E. Thompson
ATTORNEY Patented Mar. 7, 1944

2,343,593

UNITED STATES PATENT OFFICE 2,343,593

HINGE

Herbert Traumüller, Brooklyn, N. Y.

Application August 20, 1943, Serial No. 499,351

10 Claims. (Cl. 16—159)

This invention relates to hinges of the type designed, primarily for use in hingedly coupling boxes and other parts of small sizes, and when composed, at least partially of wood or plastic material. More particularly, the invention relates to hinges of this class having integral means or, in other words, means formed from attaching plate portions of the butts of the hinge for securely retaining the butts in connection with, and against accidental displacement from, their respective supports. The novel features of the invention will be best understood from the following descriptions when taken together with the accompanying drawing, in which certain embodiments of the invention are disclosed, and in which the separate parts are designated by suitable reference characters in each of the views, and in which:

Fig. 1 is a perspective view of one end portion of two box parts, showing one form of hinge which I employ.

Fig. 2 is a plan view of the structure shown in Fig. 1, with one of the parts indicated in dot and dash lines in open position.

Fig. 3 is a section on the line 3—3 of Fig. 2.

Fig. 4 is a view similar to Fig. 3, showing the use of a spring for supporting the box parts in opened and closed positions.

Fig. 5 is a perspective view of a modified form of hinge detached.

Fig. 6 is a sectional view through one end portion of another form of hinge which I employ, the section being on the line 6—6 of Fig. 7; and Fig. 7 is a section on the line 7—7 of Fig. 6.

In hinges of the type and kind commonly employed in connection with jewelry cases and similar boxes or containers, difficulty has been experienced in securely mounting the hinge butts in connection with the respective parts by the use of small nails or similar fasteners. Furthermore, the operation of attaching the hinge butts has been expensive by virtue of the hand labor required in assembling the butts in the respective parts.

It is the purpose of my invention to dispense with the use of nails or other fastening devices, and to construct in the hinge butts, so as to form from the material of the attaching plate portions thereof, coupling members which will securely retain the butts in connection with the supports, and accomplish this attachment in a simple and economical manner. More particularly, my invention relates to hinge butts wherein the coupling or anchoring portions are formed at ends of the attaching plates, and include substantially L-shaped flanges arranged within the width of the attaching plate portions and having parts protruding beyond the ends of the attaching plate portion. In longer types of hinge butts, additional L-shaped flanges may be arranged intermediate the end flanges to further reinforce the mounting of the butts in connection with the supports.

In Figs. 1 to 3, inclusive, is illustrated one adaptation of the invention. In these figures, 10 and 11 represent portions of two box parts, and for purposes of description the part 11 may be referred to as a cover part. Adjacent walls 12 and 13 of these parts are adapted to be hingedly coupled by a hinge 14 composed of two substantially similar butts 15 and 16. The butt 15 has spaced cylindrical bearings 17, adapted to interfit with corresponding bearings 18 on the butt 16, and these bearings are joined by a pintle pin 19.

The butts 15 and 16 are in the form of elongated strips of material, the ends of which are fashioned to form substantially L-shaped coupling or mounting portions 20. One part 21 of the portions 20 is arranged at right angles to the attaching plates of the butts and is adapted to fit snugly in slits 22, formed in the walls 12—13. The other part 23 extends beyond the end of the attaching plates, and is adapted to be driven or forced into the walls 12—13 in mounting the hinge butts in their respective supports.

In most instances, the above described attachment of the butts to the supports will be sufficient to retain the butts against accidental displacement, but when desired, the attaching plates of the butts may be pricked punched, as indicated at 24, to further aid in retaining the butts against displacement by providing an interlock between the butts and the supports.

In the construction shown, the butts 15 and 16 are fashioned to adapt them for the use of a spring to produce a snap closure and opening of the cover 11 when desirable. For this purpose, the center portion of the butts is stamped out to form sockets 25, and the supports adjacent the sockets 25 will have large recesses 26 to compensate for the movement of a spring 27, as is illustrated in Fig. 4 of the drawing. The spring 27 is arc shaped in form, and has hook ends 28 adapted to engage the walls of the sockets 25 in the manner clearly illustrated in Fig. 4.

In movement of the cover, the spring 27 has the characteristic of snapping and tensionally supporting the cover in a fully opened position, that is to say, with the parts as seen in Fig. 4, as well as to tensionally support the cover in its closed position. It will be apparent that where the spring hinge construction is not required, the formation of the sockets 25 can be dispensed with in the blanking and shaping of the butt parts. The formation of the sockets 25 reinforces the hinge butts, and may be used for this purpose only.

In Fig. 5 of the drawing is shown a modification which is applicable to a longer type of hinge. In Fig. 5, butts 29 and 30 are employed. The butts are substantially of the same form and are hingedly coupled by interfitting bearings, as at 31, in a manner similar to the structure shown in Figs. 1 to 3, and also include L-shaped end couplings 32, similar to the couplings 20. Centrally of the butts are also indicated sockets 33, similar to the sockets 25. In this connection, where exceptionally long butts are employed, two or more of the sockets or reinforcements may be employed on each butt. The feature of the hinge of Fig. 5, which differentiates primarily from that shown in Figs. 1 to 3, inclusive, is in the inclusion of the supplemental L-shaped couplings 34 which are fashioned from the material of the attaching plates, and are arranged inwardly of end portions thereof.

The supplemental couplings 34 will function in the same manner as the end couplings 32, and will operate to interlock with the supports and further to reinforce the attaching plate portions or the mounting of the butts as a whole in connection with the respective supports. This type of construction is particularly desirable when the butts are formed from thin sheet material. At this time, it is pointed out that while in many instances, sheet metal will be used in the construction of butts, in other instances, the butts may be composed of plastic material.

In Figs. 6 and 7 of the drawing is shown another modification which differs from the structure shown in Figs. 1 to 5, inclusive, simply in the general formation of the butt. In Figs. 1 to 5, the cylindrical bearings are formed on the side edge of a long attaching plate, which means that the attaching plate is of single thickness. In Figs. 6 and 7, the attaching plates of the butts are formed of two thicknesses, as indicated at 35 and 36, by simply folding the sheet centrally, and with this structure the pintle bearings 37 are formed at the fold in the sheet.

With the structure shown in Fig. 7, the L-shaped end couplings 38 will be preferably formed from the sheet 36, as is indicated in Fig. 7, whereas if additional couplings similar to the couplings 34 are employed, these will be formed from the sheet 35. The sheet 36 is also preferably provided with large apertures 39, so positioned thereon as to register with that part of the sheet 35 in which the prick punch 40 is adapted to be formed. This prick punch is illustrated in Figs. 6 and 7, thus showing the butt presumably as secured to its support, although the support has been omitted for sake of clarity.

In the construction shown, and when the butts of the type illustrated in Figs. 6 and 7 are mounted in connection with their supports, the plate 36 will be the exposed plate, thus it can be regarded as the outer plate, and the plate 35, the concealed plate, and thus can be considered as the inner plate.

It will be apparent that the L-shaped mounting portions of the butts have outer edges which are in alinement with and continuous with the outer edges of the attaching plate portions of the butts. This construction will securely retain the butts in connection with their supports and prevent the raising of outer corners of the attaching plates which might otherwise occur.

Having fully described my invention, what I claim as new and desire to secure by Letters Patent is:

1. A hinge comprising two substantially similar butts, each butt having a flat mounting plate portion terminating at one edge in cylindrical pintle bearings, end portions of the attaching plate having L-shaped mounting portions arranged within the limits of the width of the attaching plate, including parts protruding beyond the end limits of the attaching plate of the butt, and the attaching plate of each butt having inwardly of the ends thereof other L-shaped mounting portions for coupling the butt with its support intermediate said end coupling portions.

2. A hinge comprising two substantially similar butts, each butt having a flat mounting plate portion terminating at one edge in cylindrical pintle bearings, end portions of the attaching plate having L-shaped mounting portions arranged within the limits of the width of the attaching plate, including parts protruding beyond the end limits of the attaching plate of the butt, the attaching plates of the butts being of two ply thickness, and said end mounting portions being formed integral with one of said plates.

3. The combination with supports adapted to be hingedly coupled and having slots opening through adjacent abutting surfaces of the supports to be hingedly coupled, of a hinge comprising two butts, each butt having a flat attaching plate portion, means hingedly coupling adjacent edges of the attaching plate portions of the butts, the ends of said butts having L-shaped mounting members, one leg of said mounting members being adapted to enter the slots on the adjacent surfaces of the supports, and the other legs of said members being forceably driven into the support at an angle to the slots therein in mounting the butts in connection with the respective supports.

4. The combination with supports adapted to be hingedly coupled and having slots opening through adjacent abutting surfaces of the supports to be hingedly coupled, of a hinge comprising two butts, each butt having a flat attaching plate portion, means hingedly coupling adjacent edges of the attaching plate portions of the butts, the ends of said butts having L-shaped mounting members, one leg of said mounting members being adapted to enter the slots on the adjacent surfaces of the supports, the other legs of said members being forceably driven into the support at an angle to the slots therein in mounting the butts in connection with the respective supports, said supports having recesses intermediate the ends of said butts, and a spring coupled with the attaching plates of the butts in alinement with said last named recesses in providing a spring hinge for said supports.

5. The combination with supports adapted to be hingedly coupled and having slots opening through adjacent abutting surfaces of the supports to be hingedly coupled, of a hinge comprising two butts, each butt having a flat attaching plate portion, means hingedly coupling adjacent edges of the attaching plate portions of the butts, the ends of said butts having L-shaped mounting members, one leg of said mounting members being adapted to enter the slots on the adjacent surfaces of the supports, the other legs of said members being forceably driven into the support at an angle to the slots therein in mounting the butts in connection with the respective supports, and other means on the attaching plates with said butts intermediate the ends thereof engaging the supports in securing the butts to said supports.

6. The combination with supports adapted to be hingedly coupled and having slots opening through adjacent abutting surfaces of the supports to be hingedly coupled, of a hinge comprising two butts, each butt having a flat attaching plate portion, means hingedly coupling adjacent edges of the attaching plate portions of the butts, the ends of said butts having L-shaped mounting members, one leg of said mounting members being adapted to enter the slots on the adjacent surfaces of the supports, the other legs of said members being forceably driven into the support at an angle to the slots therein in mounting the butts in connection with the respective supports, other means on the attaching plates with said butts intermediate the ends thereof engaging the supports in securing the butts to said supports, and said last named means comprising members keying the butts to the supports.

7. The combination with supports adapted to be hingedly coupled and having slots opening through adjacent abutting surfaces of the supports to be hingedly coupled, of a hinge comprising two butts, each butt having a flat attaching plate portion, means hingedly coupling adjacent edges of the attaching plate portions of the butts, the ends of said butts having L-shaped mounting members, one leg of said mounting members being adapted to enter the slots on the adjacent surfaces of the supports, the other legs of said members being forceably driven into the support at an angle to the slots therein in mounting the butts in connection with the respective supports, other means on the attaching plates with said butts intermediate the ends thereof engaging the supports in securing the butts to said supports, and said last named means comprising other L-shaped mounting members.

8. The combination with supports adapted to be hingedly coupled and having slots opening through adjacent abutting surfaces of the supports to be hingedly coupled, of a hinge comprising two butts, each butt having a flat attaching plate portion, means hingedly coupling adjacent edges of the attaching plate portions of the butts, the attaching plates of said butts having integral mounting members extending therefrom and imbedded in said adjacent surfaces of the support, at least parts of said members being arranged in the slots of said supports, other means on the attaching plates engaging surfaces of the supports at right angles to said first named surfaces in keying the butts against detachment from the supports, said attaching plates being composed of two superimposed sheets of material, said members being formed from one of said sheets, and said last named means being formed from the other of said plates.

9. The combination with supports adapted to be hingedly coupled and having slits opening through adjacent abutting wall surfaces of the supports, of a hinge comprising two butts of similar construction, each butt having a flat attaching plate portion, means hingedly coupling adjacent edges of the attaching plate portions of the butts, end portions of the butts having L-shaped mounting members, one leg of said mounting members joining the attaching plate being adapted to enter the slits on the adjacent surfaces of the supports, and the other or end legs of said members extending angularly to the first named leg and imbedded in the wall of the supports at one side of the slits in retaining the butts in connection with the respective supports.

10. The combination with supports adapted to be hingedly coupled and having slits opening through adjacent abutting wall surfaces of the supports, of a hinge comprising two butts of similar construction, each butt having a flat attaching plate portion, means hingedly coupling adjacent edges of the attaching plate portions of the butts, end portions of the butts having L-shaped mounting members, one leg of said mounting members joining the attaching plate being adapted to enter the slits on the adjacent surfaces of the supports, the other or end legs of said members extending angularly to the first named leg and imbedded in the wall of the supports at one side of the slits in retaining the butts in connection with the respective supports, the attaching plates of said butts being arranged on surfaces angularly to said abutting surfaces, and other means integrally with the attaching plate portions of the butts extending into interlocking relation with portions of said supports for retaining the butts in connection with the supports.

HERBERT TRAUMÜLLER.